United States Patent [19]

Hughes

[11] Patent Number: 4,637,419

[45] Date of Patent: Jan. 20, 1987

[54] SUBSEA CONTROL POD VALVE ASSEMBLY

[75] Inventor: David W. Hughes, Houston, Tex.

[73] Assignee: Vetco Offshore, Inc., Ventura, Calif.

[21] Appl. No.: 629,206

[22] Filed: Jul. 9, 1984

[51] Int. Cl.$^4$ ............................................. F16L 29/00
[52] U.S. Cl. ............................ 137/236.1; 137/596.18;
137/627.5; 251/148; 251/77; 251/63.6;
251/63.5; 166/319
[58] Field of Search ........... 137/627.5, 596.18, 625.66,
137/236 S, 798; 251/148, 63.5, 77, 63.4, 63.6;
285/137 R, 137 A; 166/319, 322, 344

[56] References Cited

U.S. PATENT DOCUMENTS

| | | | |
|---|---|---|---|
| 1,656,132 | 1/1928 | Arrasmith et al. | 137/596.18 |
| 3,478,782 | 11/1969 | Peeples | 137/627.5 |
| 3,921,660 | 11/1975 | Kowalski | 137/625.66 X |
| 3,957,079 | 5/1976 | Whiteman | 137/596.18 |
| 3,974,861 | 8/1976 | Goto et al. | 137/627.5 |
| 4,011,892 | 3/1977 | Kowalski | 137/625.66 |
| 4,404,989 | 9/1983 | LeMoine | 137/798 X |
| 4,457,489 | 7/1984 | Gilmore | 137/596.18 X |

FOREIGN PATENT DOCUMENTS 2115906  9/1983  United Kingdom .......... 137/625.66

Primary Examiner—Samuel Scott
Assistant Examiner—Carl D. Price
Attorney, Agent, or Firm—Prutzman, Kalb, Chilton & Alix

[57] ABSTRACT

A connector for use in establishing a flow path for a control fluid between a pressurized source and a hydraulically controllable device located at a subsea well head. The connector includes a control valve assembly which is reciprocal to establish a seal about a control port on the controllable device prior to coupling the source to the port and to isolate the source from the port prior to breaking the seal pursuant to the separation of the connection from the controllable device.

21 Claims, 1 Drawing Figure

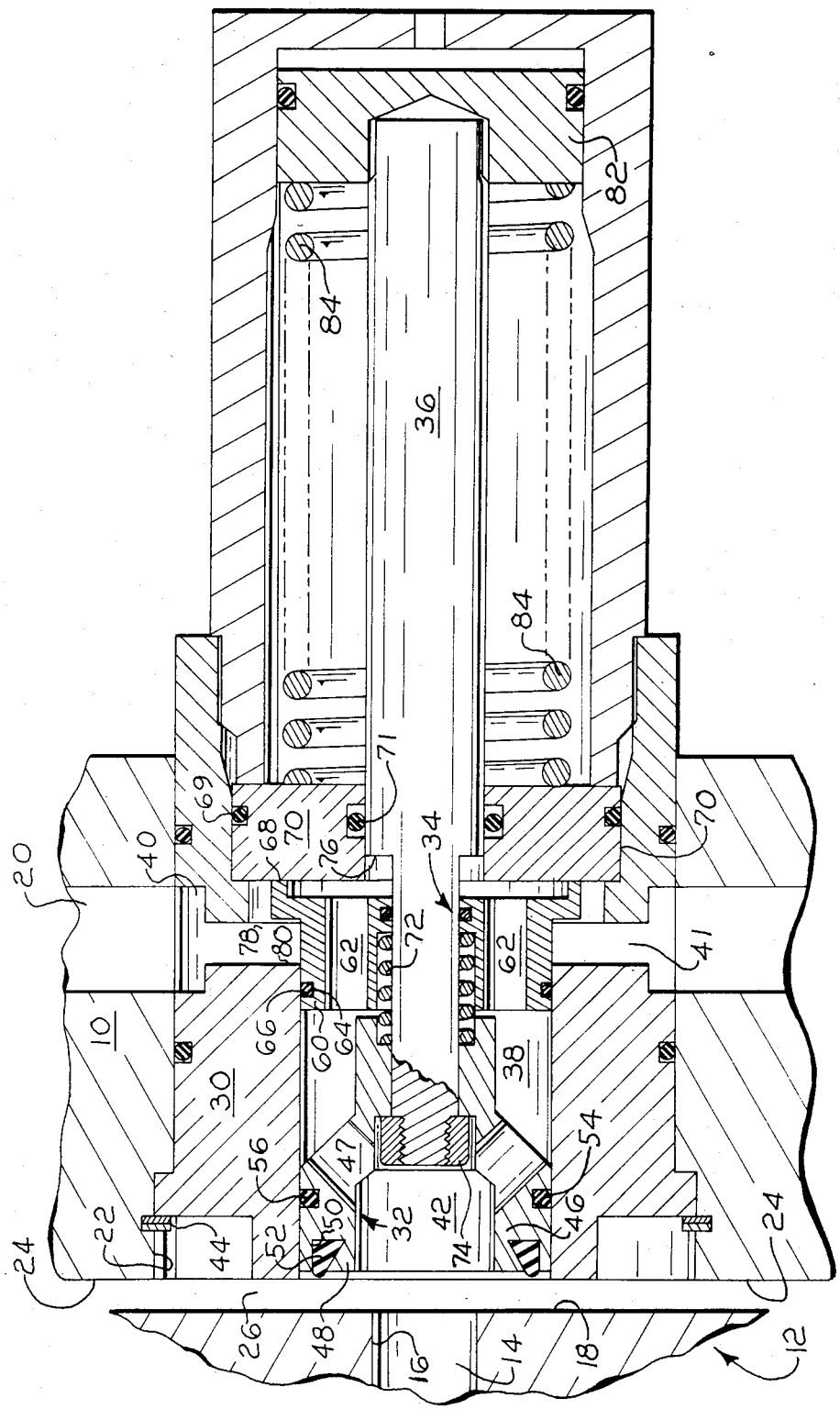

SUBSEA CONTROL POD VALVE ASSEMBLY

BACKGROUND OF THE INVENTION

This invention relates to a control valve assembly and more particularly to an underwater connectory valve assembly for use in the exercise of remote control over subsea wellhead functions.

In subsea drilling operations, it is necessary to control and monitor the wellhead apparatus from the drilling rig. The remote control of subsea wellhead functions during drilling operations requires the use of a subsea hydraulic connector. Hydraulic supply pressure and command signals (electric or hydraulic) originate on the surface and are transmitted subsea via an umbilical link to the hydraulic connector. The hydraulic connector serves to selectively route the hydraulic supply to the appropriate wellhead component, thereby actuating the component per surface-initiated commands.

A typical subsea hydraulic connector assembly consists of three basic components: (1) a control module or pod which contains pilot-operated control valves and regulators, porting, seals, etc., for directing the hydraulic control signals as appropriate to exercise control over the various wellhead, i.e., stack functions; (2) an upper stack assembly mounted on a Blow-Out Preventor stack frame; and (3) a lower-marine riser package mounted on the upper portion of the wellhead. Generally, the control pods are independently retrievable for repair of the control valves, regulators, hose bundle, etc., since it is less costly to retrieve the pod than to retrieve the riser package and upper stack assembly.

In use, a control pod is lowered and locked to the subsea mandrel comprising the upper stack assembly or riser package. The pod generally contains resilient face-sealing elements which seal against the mandrel walls thereby providing remote make/break communication to the subsea wellhead components. These sealing elements may be of annular configuration to surround the individual outlet ports in the control pod. The control pod is keyed to the mandrels in such a manner as to align the individual pod outlet ports with the corresponding inlet ports of the mandrels when a pod is landed and locked to a mandrel.

Various pod-mandrel configurations have been utilized in an effort to prevent damage to the sealing elements as a pod is lowered onto a mandrel. One common method of reducing seal damage is to taper the pod/-mandrel interface downwardly and inwardly to prevent the seals from dragging across the mandrel wall.

Another seal protection method utilizes a seal which is retracted during the mounting of the pods to the mandrels and extended for sealing engagement with the mandrel interface upon control actuation. Such an underwater connector is shown in LeMoine U.S. Pat. No. 4,404,989.

The use of retractable valve seals results in fluid loss through intermittent exhaust of the supply pressure to the interface vent space during both retraction and extension of the seal. That is, during extension of the seal toward the mandrel interface, the supply pressure is intermittently connected to the interface vent space causing fluid loss. Similarly, in retracting the seal from the mandrel interface, the supply pressure is again intermittently connected to the vent space resulting in a loss of fluid.

SUMMARY OF THE INVENTION

The present invention overcomes the above-briefly discussed and other deficiencies and disadvantages of the prior art by providing a subsea connector assembly comprising a mandrel adapted to be positioned underwater and a novel control pod adapted to engage and disengage from the mandrel. The mandrel has a plurality of fluid passageways each being connectable at one end to a fluid-operated wellhead component and terminating at the other end in an inlet port which communicates with the exterior interface surface of the mandrel. The plurality of inlet ports form an array on the interface surface of the mandrel with each inlet port being adapted for connection to a fluid supply for operation of the respective wellhead component. The control pod has a plurality of fluid passageways each being connectable at one end to a fluid supply and terminating at the other end in an outlet port in an exterior interface surface of the pod. The plurality of outlet ports in the interface surface of the pod form an array complementary to the array of inlet ports in the mandrel. The interface surface of the control pod is spaced from the interface surface of the mandrel to form a vent space therebetween for venting the fluid passageways and wellhead components. Each outlet bore of the control pod has associated therewith a control-valve assembly having a movable valve body with an outlet port, an interior chamber, and an inlet port which is connected by a fluid passageway in the control pod to a fluid supply. An actuator subassembly is coupled to each of the valve bodies for causing movement thereof between a first position wherein the valve body outlet port is spaced from the exterior interface of the mandrel and a second extended position wherein the valve body outlet port is sealingly connected to the inlet bore of the mandrel. A stopper apparatus for opening and closing off fluid flow through the valve body is moveably mounted within the chamber for movement between a first closed position closing off fluid flow and a second open position permitting fluid flow. An actuable control is operationally connected to the connector and stopper for moving the connector from the retracted position to the extended position and successively moving the stopper from the closed position to the open position and for moving the stopper from the open position to the closed position and successively moving the connector from the extended position to the retracted position.

Accordingly, it is an object of the present invention to provide a new and improved subsea control pod valve assembly for remote make/break fluid connection to subsea mandrel components.

A further object of the invention is to provide a subsea control pod valve assembly which prevents fluid loss through intermittent exhaust of the supply pressure to the interface vent space during retraction and extension of the valve connector.

Other objects will be in part obvious and in part pointed out in more detail hereinafter.

BRIEF DESCRIPTION OF THE DRAWING

The drawing is a diagrammatical sectional view of a control valve assembly in accordance with the present invention, the valve being shown mounted in a control pod which is locked to a mandrel.

DESCRIPTION OF THE PREFERRED EMBODIMENT

Referring to the drawing, a valve assembly for a control pod in accordance with the present invention is shown mounted within a control pod housing, indicated generally at 10, which has mated to a mandrel, which is indicated generally at 12. It is understood that the mandrel 12 is of the type adapted to be positioned underwater and has a plurality of fluid passageways 14 (only one of which is shown) each of which is connectable at one end to a fluid operated wellhead component and terminates at the other end at an inlet port 16 in an exterior interface surface 18. Similarly, the control pod housing 10 is of the type adapted to engage and disengage from the mandrel 12 and has a plurality of fluid passageways 20 (only one of which is shown) each of which is connectable at one end to a fluid supply line and terminates at the other end. The bores 22 extend from a bore 22 in an exterior interface surface 24 to intersect the passageways 20. In subsea assembly, the array of outlet bores 22 of the control pod 10 are in registration with the array of inlet ports 16 of the mandrel 12 with the interface surfaces 18, 20 being in a spaced relationship to form a vent space 26 therebetween for venting the fluid passageways 14 and wellhead components.

A control pod valve assembly, is received in each of bores 22 and generally comprises a valve body 30, a connector seal 32, a flow stopper 34, and a control stem 36.

The valve body 30 includes a bore 38 which communicates via a passage 41 with an annular inlet port 40. The valve body 30 is mounted within the bore 22 of the pod member 10 with an outlet port 42 aligned with the inlet port 16 of the mandrel 12. A retaining ring 44 detachably secures the valve body 30 within the control pod housing 10.

The connector seal 32 includes a movable element 46 having a stepped annular configuration as shown. Element 46 defines, in its larger diameter portion, the outlet port 42. Element 46 is provided, in the angled region between its smaller and larger diameter portions, with passages 47 which provide fluid communication between outlet port 42 and the interior of bore 38. Element 46 is slidably mounted within the bore 38 for movement between a retracted position as shown in the drawing and a extended position where it is in sealing engagement with the surface 18 of the mandrel 12. The end 48 of element 46 which faces mandrel 12 has a coaxial annular groove 50 mounting an axially extending annular seal 52 for sealing engagement with the interface surface 18 of the mandrel 12 about the inlet bore 16 when the connector element 46 is in the extended position. The outer wall of the connector element 46 has a coaxial annular groove 54 mounting a ring-type seal 56 for sealing engagement with the interior cylindrical wall of the bore 38 of valve body 30. Accordingly, the movable connector element 46 functions to sealingly connect the control pod flow path which is in part defined by the valve assembly to the remote inlet port 16 of the mandrel 12 when the connector element is in the extended position. Element 46 is also retractable to protect the annular seal 52 from damage during attachment of pod 10 to and detachment of pod 10 from the mandrel 12 and to permit venting of the mandrel passageway 14 to the vent space 26.

The flow stopper 34 functions to alternately enable and prevent fluid flow from the inlet port 40 to bore 38. Stopper 34 includes a sleeve element 60 slidably mounted within bore 38 for movement between a retracted or closed position as shown in the drawing and an extended or open position wherein fluid flow through axially extending fluid passageways 62 is permitted.

The stopper sleeve 60 has an annular groove 64 in its outer surface, groove 64 receiving an O-ring seal 66 which cooperates with the interior wall of valve body 30 which forms bore 38 to prevent leakage between sleeve 60 and valve body 30. Sleeve 60 is also provided with a second groove and O-ring which prevent leakage between sleeve 60 and stem 36. The stopper sleeve 60 also has an axially disposed annular seal face 68 which cooperates with a seat 70 mounted within bore 38. An outer annular seal 69 seals the seat 70 to the valve body 30 while an inner annular seal 71 seals the seat 70 to the control stem 36. Thus, in the retracted closed position as shown in the drawing, the stopper sleeve 60 sealing engages the seat 70 to seal off the inlet port 40 and prevent fluid flow through the valve assembly.

The connector element 46 and the stopper sleeve 60 are slidably mounted about the coaxially disposed control stem 36 and are biased apart by a compression spring 72 encircling the control stem 36. Consequently, the spring 72 biases the stopper sleeve 60 toward the retracted closed position and biases the connector element toward the extended position. As will be explained, the spring 72 coacts with the control stem 36 to permit the connector element to sealingly engage the mandrel 12 before the stopper sleeve moves from the closed position to the open position and, conversely, to permit the stopper sleeve to move from the open position to the closed position before the connector element disengages from the mandrel 12.

The actuator stem 36 is slidably mounted within the valve body 30 for movement between a retracted position (as shown in the drawing) wherein the connector element is retracted into the valve body and fluid flow through the control pad is prevented and an extended position wherein connector element 46 sealing engages the mandrel 12 and fluid may flow through the valve body to the mandrel passageway 14. During movement between the extended and retracted positions, the control stem 36 functions to prevent the intermittent connection of the fluid supply passageway 20 to the vent space 26. To this end, the control stem includes a first abutment shoulder defined by a nut 74 engaged to its exterior end for driving engagement with the connector element 46 to drive the connector element, and thus also the stopper sleeve 60, from the extended position to the retracted position upon movement of the control stem from its extended position to its retracted position. The control stem also includes a second abutment shoulder 76 to drivingly engage the stopper sleeve 60 to drive the stopper sleeve, and thus also the connector element 46, from the closed position to the open position upon movement of the control stem 36 from the retracted position to the extended position. In summary, the connector element 46 and the stopper sleeve 60 are loosely captured on stem 36 between shoulder 76 and nut 74.

The nut 74 and abutment shoulder 76 are displaced on the control stem 36 so that the relative movement of the connector element 46 and the stopper sleeve 60 is a two step operation which precludes undesirable exhaust of the fluid supply to vent. More specifically, the control stem 36 controls the movement of the connector element 46 and the stopper sleeve 60 in the following manner. Beginning with the valve assembly in the retracted closed position as shown in the drawing, connection of the control pod 10 to the mandrel 12 is accomplished by causing the control stem to move from the retracted position to the extended position in response to the application of control pressure. Movement of the control stem will be transmitted to element 46 by the spring 72. Accordingly, the connector element 46 will move toward the mandrel 12 together with the stem 36. At the same time, the spring 72 continues to bias the stopper sleeve 60 to the retracted closed position to close off the inlet port 40.

As the stem 36 continues to move outwardly, the connector element 46 will sealingly engage the interface surface 18 of the mandrel 12 under the force of the biasing spring 72. Further movement of stem 36 causes the second abutment shoulder 76 to engage the stopper sleeve 60 whereupon further extension of stem 36 compresses spring 72 and drives the stopper sleeve outwardly away from engagement with seat 70 thereby opening the inlet port 40. The stem 36 will move the stopper sleeve outwardly until the flange 78 of the stopper sleeve abuts shoulder 80 of the valve body 30. Thus, the stem 36 drives the stopper sleeve 60 from the closed position to the open position. Importantly, the control stem 36 causes the opening of the inlet port 40 subsequent to the establishment of sealing engagement between the connector element 46 and the mandrel 12 thus preventing any intermittent fluid connection of the supply paassageway 20 to the vent space 26.

In the open position, fluid flows from the supply passageway 20 through the inlet port 40 and through the fluid passageways 62, 47 of the stopper sleeve and connector element respectively into the inlet port 16 of the mandrel 12 to operate the wellhead component.

In order to shut off the fluid flow and retract the connector element 46, the application of control pressure is discontinued and control stem 36 moves from the extended position to the retracted position under the influence of spring 84. As the control stem 36 begins to move inwardly, the movement of the abutment shoulder 76 inwardly allows the compression spring 72 to propel the stopper sleeve 60 inwardly (thereby following the stem 36) from its open position to its closed position while, at the same time, the spring 72 is biasing the connector element 46 into sealing engagement with the mandrel 12. In this manner, the fluid flow from the supply passageway 20 is closed off by the stopper sleeve 60 prior to the disengagement of the seal 52 from the mandrel interface surface 18. As the stem continues to move inwardly, the nut 74 engages the connector element 46 to withdraw the connector element from the mandrel interface surface 18 thereby venting the passageway 14. Importantly, the control stem 36 causes the disengagement of the connector element 46 from the mandrel 12 subsequent to the closing off of the inlet port 40 to prevent any intermittent fluid connection of the supply passageway 20 to the vent space 26.

Consequently, the supply passageway 20 is not intermittently connected to the vent space 26 via the valve assembly during either the connection or disconnection operation. Controlled movement of the actuator stem is accomplished by a fluidic actuator including pilot piston 82 operated from a surface control in a conventional manner. Upon actuation, the pilot piston 82 drives the control stem 36 from its retracted position to its extended position thereby connecting the valve assembly with the mandrel 12 in the manner previously described. Upon relief of the applied pressure, the compression spring 84, extending between the seat 70 and the pilot piston 82, will drive the control stem 36 from its extended position to its retracted position thereby closing off fluid flow and retracting the connector element 46 within the valve body 30.

Accordingly, a subsea control pod valve assembly for remote make/break fluid connection to a subsea mandrel is provided which prevents fluid loss through intermittent exhaust of the supply pressure to the interface vent space during connection and disconnection.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A remotely controllable connector assembly for selectively establishing and interrupting a fluid supply path between a source of fluid and an inlet port of a member to be controlled, said connector assembly comprising:

valve body means, said body means defining a bore which terminates at an exterior face of said body means, said body means also defining a fluid supply passage which provides fluid communication between a fluid supply port located on said body means and said bore;

means for coupling said body means to the member to be controlled, said coupling means being at least in part housed in said bore and including:

seal means, said seal means being moveable between a first retracted position where said seal means is located within said bore and a second extended position where said seal means is in part extended from said bore beyond said body means exterior face, said seal means having a fluid flow passage extending therethrough whereby a continuous flow path between said flow passage and an inlet port on the member to be controlled may be established when said seal means is in the extended position, valve means positioned within said bore, said valve means being moveable between a valve means first position where fluid flow between said supply passage and said flow passage is prevented and a valve means second position where fluid communication between said supply passage and said flow passage is established, and means for resiliently simultaneously biasing said seal means and valve means in first and second opposite directions, said seal means being biased towards said extended position and said valve means being biased toward said valve means first position; and reciprocal actuator means, said actuator means extending into said bore and engaging said seal means to move said seal means against the bias of said resilient biasing means from the extended position to the retracted position during movement of said actuator means in a first of said opposite directions, said actuator means engaging said valve means to move said valve means against the bias of said resilient biasing means from said valve means first position to said valve means second position during movement of said actuator means in the second of said opposite directions.

2. The apparatus of claim 1 wherein said seal means comprises:
   a connector element mounted within said bore for movement between said retracted position and said extended position, said connector element having:
      an external end, a first seal being mounted on said external end for engagement with the member to be controlled about an inlet port on the member to be controlled, said external end extending from said valve body means when said connector element is in said extended position,
      an outer side wall extending from said external end, said side wall being at least in part complimentary in shape with said bore, and
      means establishing a sliding fluid tight seal between said valve body means and said outer wall.

3. The apparatus of claim 2 wherein said valve means comprises:
   a sleeve element mounted within said bore for movement between said valve means first position and said valve means second position; and
   means for establishing a fluid tight seal between said sleeve element and said valve body means to prevent fluid flow between said supply passage and said bore when said sleeve element is in said valve means first position.

4. The apparatus of claim 3 wherein said actuator means comprises:
   control stem means, said stem means having a first abutment shoulder for engaging said connector element to move said connector element from said extended position to said retracted position during movement of said stem means in the said first of said opposite directions, said stem means further having a second abutment shoulder for engaging said sleeve element to move said sleeve element from said valve means first position to said valve means second position during movement of said stem means in the said second of said opposite directions;
   said first abutment shoulder being disposed on said stem means to drive said connector element to said retracted position subsequent to said sleeve element moving from said valve means second position to said valve means first position under the influence of said resilient biasing means; and
   said second abutment shoulder being disposed on said stem means to drive said sleeve element to said valve means second position against the bias of said resilient biasing means subsequent to said connector element moving from said retracted position to said extended position.

5. The apparatus of claim 4 wherein said resilient biasing means comprises a compression spring interconnecting said connector element and said sleeve element, said compression spring biasing said connector element and said sleeve element away from one another.

6. The apparatus of claim 4 wherein said actuator means further comprises:
   second resilient means for biasing said stem means in said first direction; and
   a fluid actuated pilot piston for driving said stem means in said second direction.

7. The apparatus of claim 1 wherein said actuator means comprises:
   control stem means, said stem means having a first abutment shoulder for engaging said seal means to move said seal means from said extended position to said retracted position during movement of said stem means in the said first of said opposite directions, said stem means further having a second abutment shoulder for engaging said valve means to move said valve means from said valve means first position to said valve means second position during movement of said stem means in said second of said opposite directions;
   said first abutment shoulder being positioned on said stem means to drive said seal means to said retracted position subsequent to said valve means moving from said valve means second position to said valve means first position under the influence of said resilient biasing means; and
   said second abutment shoulder being positioned on said stem means to drive said valve means to said valve means second position against the bias of said resilient biasing means subsequent to said seal means moving from said retracted position to said extended position.

8. The apparatus of claim 7 wherein said actuator means further comprises:
   means for moving said stem means in said first and second directions.

9. The apparatus of claim 1 wherein said bore comprises a cylindrical wall which defines an interior chamber with said supply passage being generally radially oriented with respect to said chamber and wherein said seal means comprises:
   a connector element mounted within said interior chamber for movement between said retracted position and said extended position, said connector element having:
      an external end, a first annular seal mounted on said external end for engagement with the member to be controlled about an inlet port thereon, said external end extending from said valve body means when said connector element is in said extended position,
      an outer circumferential wall extending from said external end and being at least in part complimentary in shape to said interior chamber, and
      a second seal for establishing a fluid tight seal between said outer circumferential wall and said cylindrical wall,
      said seal means fluid flow passage interconnecting said chamber and said external end, said fluid flow passage being co-axial with said first seal.

10. The apparatus of claim 9 wherein said valve means comprises:
    a sleeve element mounted within said interior chamber for movement between said valve means first position and said valve means second position, said sleeve element having a flow passage for interconnecting said interior chamber and said supply passage; and
    a third seal for fluidically isolating said supply passage from said flow passage when said sleeve element is in said valve means first position.

11. The apparatus of claim 10 wherein said actuator means comprises:
    an actuator stem slidably mounted at least partly within said interior chamber, said stem having first engagement means configured for driving said connector element from said extended position to said retracted position, said stem further having second engagement means configured for driving said sleeve element from said valve means first position to said valve means second position;

said first engagement means being disposed on said stem to drive said connector element to said retracted position subsequent to said sleeve element moving from said valve means second position to said valve means first position; and said second engagement means being disposed on said stem to drive said sleeve element to said valve means second position subsequent to said connector element moving from said retracted position to said extended position.

12. A subsea connector assembly comprising:

a mandrel member having at least a first fluid passage extending therethrough, said passage having first and second ends, a first end of said passage being connectable to a fluid operated well-head component, said second end of said passage defining a mandrel inlet port on an exterior interface surface of said mandrel member;

a control pod member adapted to engage and disengage from said mandrel member, said pod member having at least a first passage therein, said pod member passage having a first end connectable to a source of pressurized fluid, said pod member first passage extending from said first end to a second end which defines an outlet port on an exterior interface surface of said pod member, said exterior interface surface of said pod member being spaced from said exterior interface surface of said mandrel member to form a vent space therebetween when said pod member is engaged with said mandrel member; and a control valve assembly mounted in said pod member first passage, said control valve assembly including:

valve body means, said body means defining a bore which terminates at a face of said body means, said body means also defining a fluid supply passage which provides fluid communication between a supply port on an exterior surface of said body means and said bore;

means for coupling said supply passage to said mandrel member passage, said coupling means being at least in part housed in said bore and including:

seal means, said seal means being moveable between a first retracted position where said seal means is located within said bore and a second extended position where said seal means is in part extended from said bore beyond said body means face across said vent space to contact said mandrel member interface surface in a region extending about said mandrel inlet port to establish a fluid tight seal to said interface surface, said seal means having a seal means fluid flow passage extending therethrough, a continuous flow path being established between said seal means flow passage and said mandrel member passage when said seal means is in the extended position, valve means positioned within said bore, said valve means being moveable between a valve means first position where said valve means prevents fluid flow between said supply passage and said seal means flow passage and a valve means second position where said supply passage is in fluid communication with said seal means flow passage via said bore, and means for resiliently simultaneously biasing said seal means and said valve means in first and second opposite directions, said seal means being biased toward said extended position and said valve means being biased towards said valve means first position; and reciprocal actuator means, said actuator means extending into said bore and engaging said seal means to move said seal means against the bias of said resilient biasing means from the extended position into the retracted position during movement of said actuator means in a first of said opposite directions, said actuator means being arranged to engage said valve means to move said valve means against the bias of said resilient biasing means from said valve means first position to said valve means second position during movement of said actuator means in a second of said opposite directions.

13. The apparatus of claim 12 wherein said seal means comprises:

a connector element mounted within said bore for movement between said retracted position and said extended position, said connector element having:

an external end, a first annular seal being mounted on said external end for sealing engagement with said mandrel member interface surface about said inlet port, said external end extending from said valve body means when said connector element is in said extended position, an outer side wall extending from said external end and being at least in part complimentary in shape with said bore, and means establishing a sliding fluid tight seal between said valve body means and said outer wall.

14. The apparatus of claim 13 wherein said valve means comprises:

a sleeve element mounted within said bore for movement between said first position and said second position; and means for establishing a fluid tight seal between said sleeve element and said valve body means to prevent fluid flow between said supply passage and said bore when said sleeve element is in said first position.

15. The apparatus of claim 14 wherein said actuator means comprises:

control stem means, said stem means having a first abutment shoulder for engaging said connector element to move said connector element from said extended position to said retracted position during movement of said stem means in said first of said opposite directions, said stem means having a second abutment shoulder for engaging said sleeve element to move said sleeve element from said valve means first position to said valve means second position during movement of said stem means in said second of said opposite directions;

said first abutment shoulder being located on said stem means to drive said connector element to said retracted position subsequent to said sleeve element moving from said valve means second position to said valve means first position under the influence of said resilient biasing means; and said second abutment shoulder being disposed on said stem means to drive said sleeve element to said valve means second position against the bias of said resilient biasing means subsequent to said connector element moving from said retracted position to said extended position.

16. The apparatus of claim 12 wherein said actuator comprises:

control stem means, said stem means having a first abutment shoulder for engaging said seal means to move said seal means from said extended position to said retracted position during movement of said stem means in said first of said opposite directions, said stem means further having a second abutment shoulder for engaging said valve means to move said valve means from said valve means first position to said valve means second position during movement of said stem means in said second of said opposite directions;

said first abutment shoulder being located on said stem means to drive said seal means to said retracted position subsequent to said valve means moving from said valve means second position to said valve means first position under the influence of said resilient biasing means; and said second abutment shoulder being located on said stem means to drive said valve means to said valve means second position against the bias of said resilient biasing means subsequent to said seal means moving from said retracted position to said extended position.

17. The apparatus of claim 12 wherein said resilient biasing means comprises a compression spring extending between said seal means and said valve means.

18. The apparatus of claim 16 wherein said actuator means further comprises:

means for moving said stem means in said first and second directions.

19. The apparatus of claim 12 wherein said bore comprises a cylindrical wall which defines an interior chamber with said supply passage being generally radially oriented with respect to said chamber and wherein said seal means comprises:

a connector element mounted within said interior chamber for movement between said retracted position and said extended position, said connector element having:

an external end, a first annular seal mounted on said external end for sealing engagement with said mandrel member interface surface about said inlet port thereon, said external end extending from said valve body means when said connector element is in said extended position, an outer circumferential wall extending from said external end and being at least in part complimentary in shape to said bore, and a second seal for establishing a fluid tight seal between said outer circumferential wall and said cylindrical wall, said seal means fluid flow passage interconnecting said chamber and said external end, said fluid flow passage being co-axial with said first seal.

20. The apparatus of claim 19 wherein said valve means comprises:

a sleeve element mounted within said interior chamber for movement between said first position and said second position, said sleeve element having a flow passage interconnecting said interior chamber and said supply passage; and a third seal for fluidically isolating said supply passage from said flow passage when said sleeve element is in said first position.

21. The apparatus of claim 20 wherein said actuator means comprises:

an actuator stem slidably mounted at least partly within said interior chamber, said stem having first engagement means configured for driving said connector element from said extended position to said retracted position, said stem further having second engagement means configured for driving said sleeve element from said valve means first position to said valve means second position;

said first engagement means being disposed on said stem to drive said connector element to said retracted position subsequent to said sleeve element moving from said valve means second position to said valve means first position; and said second engagement means being disposed on said stem to drive said sleeve element to said valve means second position subsequent to said connector element moving from said retracted position to said extended position.

* * * * *